United States Patent [19]

Kaegebein

[11] 3,815,137

[45] June 4, 1974

[54] NOTCH FILTER NETWORK

[75] Inventor: Daniel P. Kaegebein, Depew, N.Y.

[73] Assignee: Sinclair Radio Laboratories, Inc., Tonawanda, N.Y.

[22] Filed: Nov. 27, 1972

[21] Appl. No.: 309,772

Related U.S. Application Data

[60] Division of Ser. No. 58,357, July 27, 1970, Pat. No. 3,717,827, which is a continuation-in-part of Ser. No. 646,064, June 14, 1967, abandoned.

[52] U.S. Cl. ........................ 343/180, 325/8, 325/23

[51] Int. Cl. ............................................ H04l 5/08

[58] Field of Search ............ 325/8, 4, 2, 18, 21–23, 325/128, 129, 178, 180; 343/175, 180; 333/76.82 R

[56] References Cited

UNITED STATES PATENTS

| | | | |
|---|---|---|---|
| 3,293,644 | 12/1966 | Loos et al. | 343/180 |
| 3,656,162 | 4/1972 | Mee | 343/180 |
| 3,733,608 | 5/1973 | McGhay et al. | 343/180 |

*Primary Examiner*—Richard Murray
*Assistant Examiner*—Jin F. Ng
*Attorney, Agent, or Firm*—Christel & Bean

[57] ABSTRACT

A duplex arrangement of filter networks has, on the transmitter side, a quarter wave cavity resonator tuned to the transmitter carrier frequency and coupled to the coaxial transmission line in quarter wave spaced relation. A variable quarter wave reactance section is similarly coupled to the line and coacts with the resonator to create a condition of anti-resonance at the receiver frequency. On the receiver side, a quarter wave resonator and a variable quarter wave section are similarly coupled to the transmission line a quarter wave from the antenna connection, the resonator being tuned to the receiver frequency, and the reactance section coacting with the resonator reactance to create a condition of anti-resonance at the transmitter carrier frequency. A line connecting the resonator to the transmission line can be of the same characteristic impedance or, if greater attenuation at a greater frequency separation is desired, of a lower characteristic impedance than that of said transmission line.

5 Claims, 7 Drawing Figures

NOTCH FILTER NETWORK

CROSS REFERENCE TO A RELATED APPLICATION

This application is a division of application Ser. No. 58,357 filed July 27, 1970 now U.S. Pat. No. 3,717,827 which is a continuation-in-part of my pending application Ser. No. 646,064 entitled "Notch Filter Network" filed June 14, 1967 now abandoned.

BACKGROUND OF THE INVENTION

This invention relates generally to the radio signal filtering art, and more specifically to a new and useful filter network of the notch type.

Notch filters of the distributed element or cavity type, customarily comprise a quarterwave length resonator tuned to resonate at the frequency to be rejected and connected to create a short circuit condition (series resonance) across the transmission line, causing radio energy at that frequency to be reflected back along the transmission line to the source. Notch filters of this type are characterized by a relatively sharp rejection notch compared to wide areas of low attenuation on either side of the rejection notch.

This type filter finds application in the communication field, particularly in the frequency range of 30–3,000 MHz and in the filter duplexer. This device allows the simultaneous operation on one antenna of two pieces of equipment operating on two different frequencies. Such equipment usually comprises a paired transmitter and receiver, which impose the most stringent filtering requirements.

The duplexer comprises a number of filter sections spaced along two coaxial transmission lines which lead from a common antenna terminal to each of the equipment terminals. The purpose of the filter sections on the receiver branch is to isolate the receiver from the transmitter carrier. The receiver frequency will pass by these filters allowing energy at the receiver frequency from the antenna to pass to the receiver with little attenuation. The pass band of these filters being wide compared to the rejection notch, other nearby transmitter carriers close to the receiver frequency may also enter the receiver causing desensitization of intermodulation problems. This poses an obvious problem not only in duplexers but in receivers generally.

The purpose of the filters on the transmitter branch of the duplexer is to pass the transmitter carrier and reject transmitter noise at the receiver frequency and over as wide a range about the receiver frequency as possible. This energy is reflected back and forth between the transmitter and successive filter sections and dissipated as heat. Being very low power relative to the transmitter carrier, the heating effect is minute.

The desired width of the rejection notch is determined by two factors, the selectivity of the receiver and the relative noise output of the transmitter. The limitation on minimum separation of duplexer carrier and receiver frequencies is determined by the ability of the duplexer to maintain sufficient isolation or rejection of all frequencies in the transmitter noise spectrum occurring within the pass band of the receiver. The filter sections on both branches of the duplexer contribute to this because it is the ability to reject frequencies midway between the two duplexer frequencies which now becomes very important. At the same time, it would be desirable to position such carrier and receiver frequencies as close together as possible, to conserve the frequency spectrum and thereby make it possible for more persons to operate within a given range in a given area.

SUMMARY OF THE INVENTION

A primary object of this invention is to provide an improved radio frequency filter network of the notch type, permitting a significantly closer spacing between the transmitter and receiver frequencies in a duplex operation.

It is also an object of this invention to provide the foregoing in a duplex arrangement less subject to interference from neighboring transmitters.

Another object of this invention is to provide the foregoing in a relatively simple and inexpensive arrangement which can be readily adjusted in the field without special equipment.

In one aspect thereof, the filter network of this invention is characterized by the tuning of a quarter wave length resonator to the frequency to be passed, in conjunction with a reactance coacting with a resonator reactance to create a condition of anti-resonance tuned to the frequency to be rejected and arranged to effectively short circuit the same.

A duplex arrangement of my invention is characterized in one aspect thereof by the provision, on the transmitter side, of a quarter wave resonator and a reactance coupled to the transmission line in quarter wave spacing relative thereto, the resonator being tuned to resonate at the transmitter carrier frequency and the reactance coacting with the reactance of the resonator to create a condition of anti-resonance at the receiver frequency. On the receiver side, a quarter wave resonator and a reactance are coupled to the transmission line in quarter wave spacing relative thereto, the resonator being tuned to the receiver frequency and the reactance coacting with the reactance of the resonator to create a condition of anti-resonance at the transmitter carrier frequency.

The foregoing and other objects, advantages and characterizing features of my invention will become clearly apparent from the ensuing detailed description of an illustrative embodiment thereof, reference being made to the accompanying drawing.

DETAILED DESCRIPTION OF THE ILLUSTRATED EMBODIMENTS

Figures 1, 2:
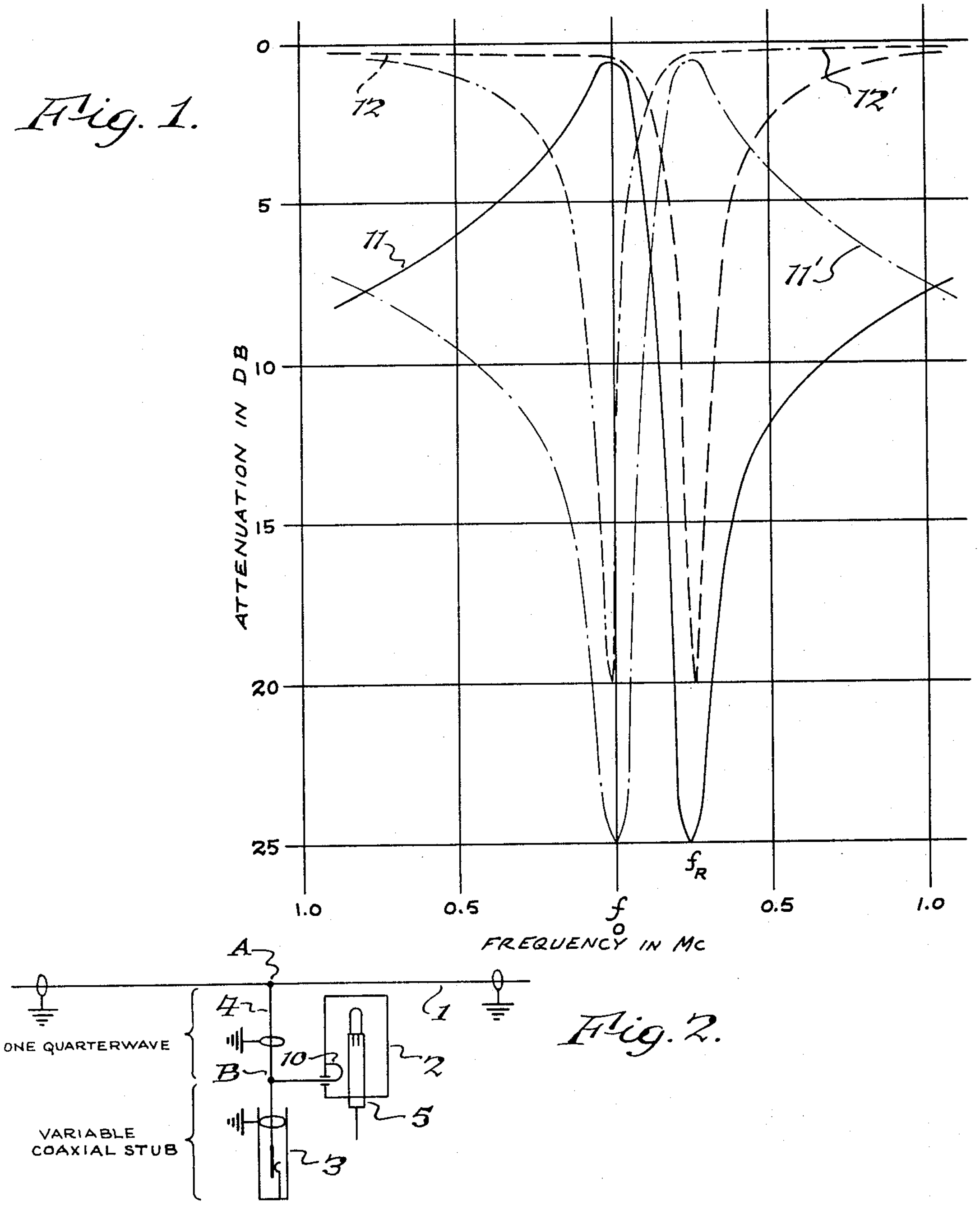
FIG. 1 is a graphical representation comparing the performance of a filter network of the instant invention with that of a conventional notch filter, as viewed between the antenna and equipment terminals.
FIG. 2 is a diagrammatic circuit representation of a filter network of this invention.

FIG. 1 shows the attenuation curve 11 of a filter network constructed in accordance with my invention, as contrasted with the attenuation curve 12 of a conventional notch filter, under the same conditions. $f_o$ represents the frequency to be passed, while $f_r$ represents the frequency to be rejected. The conventional notch filter is tuned to resonate at $f_r$ and to create a short circuit condition across the transmission line at this point. It will be noted that a relatively narrow notch is provided, with a sharp drop off in attenuation at frequencies between $f_o$ and $f_r$ including frequencies very close to the latter. The pass band, comprising the plateau extending to the left from $f_o$ (or to the right from the other side of the notch) is quite broad. This, too, presents a problem because of the possibility of interference with and from neighboring transmitters.

With my invention, however, the filter network is tuned to resonate at the frequency to be passed, namely $f_o$. Turning now to FIG. 2, there is shown a filter network of this invention comprising a co-axial transmission line 1 to which is coupled a resonator 2 and a reactance 3. Resonator 2 and reactance 3 are coupled to transmission line 1 at point A, by a coupling line 4 comprising, in this instance, a section of co-axial cable. Both resonator 2 and reactance 3 are connected in parallel to a coupling line 4 at point B, which is spaced along line 4 from point A a distance equal to substantially one quarter wave length of the frequency to be passed.

Resonator 2 can be any suitable quarter wave length resonator, comprising in the illustrated embodiment a resonating cavity of known design, arranged to be tuned by a conventional tuning means 5, all in a manner well known in the art. The outer shell of resonator 2 is grounded, as is customary. For best results, cavity resonator 2 has a high-Q factor, on the order of 6,000–7,200 for operation in the 150 Mc band, and 10,000 for operation in the 400 Mc band. It is a particular feature of this invention that, whereas the resonator 2 conventionally would be connected to line 1 at point A and tuned to the frequency to be rejected ($f_r$), it is instead spaced one quarter wave length from transmission line 1 and tuned to resonate at the frequency to be passed ($f_o$). As a result, at $f_o$ resonator 2 creates a short circuit effect at point B and inversely a high impedance at point A which latter is ignored by the signal at frequency $f_o$.

Because resonator 2 is tuned to $f_o$ a notch effect is obtained at the frequency to be passed, as clearly shown in FIG. 1 and as contrasted with the relatively broad pass band of a conventional notch filter.

In the illustrated embodiment, reactance 3 comprises a conventional variable quarter wave section of coaxial cable which can be either open or closed, and which is tunable, as indicated in a manner well-known in the art. Reactance 3 could instead be a capacitor or inductor, of known design. It is tuned against resonator 2 to coact with the reactance of resonator 2 to create, at point B, a condition of anti-resonance at the frequency to be rejected $f_r$. As a result, the combined, tuned reactance of resonator 2 and member 3 creates a short circuit effect at point A, causing the undesired frequency $f_r$ to float back and forth until it has been dissipated in the form of heat. At low energy levels, the heat thus produced usually poses no problem.

A high level of attenuation occurs at $f_r$. In addition, and of particular importance is the relatively greater attenuation at frequencies adjacent $f_o$. For example, looking at FIG. 1 the attenuation at a frequency displaced 0.1 Mc to the right of $f_o$, toward $f_r$, is over three times as great with the filter network of this invention as with the conventional notch filter. This relatively greater attenuation caused by the sharper drop off from $f_o$ in the attenuation curve toward $f_r$, means that $f_r$ can be spaced significantly closer to $f_o$ than heretofore. In effect, the reject notch is broadened, to attenuate frequencies on either side of $f_r$. Simultaneously, the pass band is inversely notched, to attenuate frequencies on both sides of $f_o$ and thereby reduce the likelihood of interference with neighboring stations.

It is a particular feature of my invention that the response characteristics of the filter can be varied by varying the coupling of cavity 2 to point B. This can be accomplished by varying loop 10. For example, decreasing the effective coupling area of loop 10 will cause the notch at $f_o$ to become sharper, and the notch at $f_r$ to become broader and possibly deeper, resulting in a steeper rate of descent from $f_o$ to $f_r$.

The filter network of FIG. 2 also can be tuned to reverse the relative positions of $f_o$ and $f_r$. This is done in a duplexer arrangement. Such reverse tuning creates a mirror image of response curves 11 and 12, as shown at 11′ and 12′ in FIG. 1.

It will be noted that the attenuation curve 11 in FIG. 1 indicates a frequency separation between $f_o$ and $f_r$ of about 0.250 Mc and an attenuation of about 25 db. This response characteristic was obtained with coupling line 4 and transmission line 1 being of the same characteristic impedance, for example both lines consisting of standard 50 ohm cable.

When the filter network of the present invention is operated in different frequency bands, a change in the frequency separation between $f_o$ and $f_r$ sometimes is required. For example, certain operating conditions require a relatively greater frequency separation between $f_o$ and $f_r$ such as in the order of 4 to 5 Mc. Without changing the size of cavity 2, operation of the filter network can be optimized for such changes in the following manner.

A greater attneuation at a greater frequency separation relative to that of the characteristic shown in FIG. 1 can be obtained by lowering the impedance of coupling line 4 relative to that normally present in the filter network and system in which it is included. In a particular example, the quarter wave cable 4 was constructed of solid air line having a lower characteristic impedance than that of the standard 50 ohm cable in the transmission line and associated system. An air line constructed for application at a frequency separation of 4–5 Mc. between $f_o$ and $f_r$, for example, can include a tubular, outer conductor of brass having an outer diameter of about 1.5 inch and a thickness of about 0.05 inch and an inner conductor having an outer diameter of about 1⅛ inch. The outer conductor inner surface is silver plated as is the outer surface of the inner conductor. This particular air line has a characteristic impedance of about 13 ohms.

The reduced losses in the large air line plus the quarterwave transforming action of a high impedance to a much lower impedance, i.e., the short circuit isolation at $f_r$, provides a relatively larger attenuation at the greater frequency separation between $f_o$ and $f_r$. This optimization of the filter network at changed operating conditions is provided while at the same time maintaining the sharp attenuation of frequencies on both sides of $f_o$ and thereby reduce the likelihood of interference with neighborhood stations.

Figure 3:
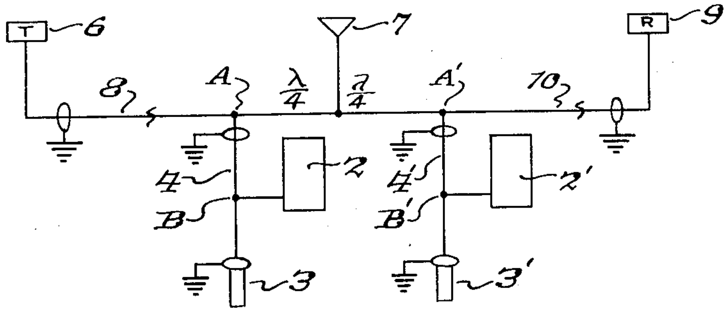
FIG. 3 is a diagrammatic circuit illustration of a duplexer arrangement incorporating a filter network of FIG. 2 in accordance with my invention.

FIG. 3 illustrates a duplex arrangement utilizing the filter network of FIG. 2 in accordance with my invention. A transmitter 6 is connected to an antenna 7 by a first coaxial transmission line 8, and a receiver 9 is connected to the same antenna 7 by a second transmission line 10. The problem is to prevent the transmission of transmitter "noise" to the receiver 9 at the receiver frequency, and to prevent desensitization of the receiver by the transmitter carrier. This problem is complicated by the fact that the transmitter carrier frequency and the receiver frequency should be spaced as closely together as possible. This is accomplished in accordance with my invention by arranging filter networks of the type shown in FIG. 2 in the duplexer arrangement of FIG. 3, as follows.

On the transmitter side, a quarter wave resonator 2 is connected at B to a quarter wave co-axial coupling line 4 which is in turn connected to transmission line 8 at A, and a variable quarter wave reactance 3 also is connected to line 4 at point B, as described in connection with FIG. 2.

The resonator 2 is tuned to the transmitter carrier frequency, which in this instance is the frequency to be passed $f_o$. The reactance 3 is tuned against resonator 2 so that its reactance, in conjunction with that of resonator 2 creates a short circuit condition at A at the receiver frequency, which on the transmitter side is the frequency to be rejected $f_r$.

On the receiver side, the same type of filter network is used, the various parts being distinguished from the corresponding network on the transmitter side by the use of primes on the corresponding reference numerals. Resonator 2' is tuned to resonate at the receiver frequency which on the transmitter side was the "noise" frequency $f_r$ to be rejected but on the receiver side is the frequency to be passed $f_o$. Since co-axial coupling line 4' spaces point B' substantially a quarter wave length from the point of connection A' to transmission line 10, resonating of cavity 2' creates a high impedance at point A' permitting the receiver frequency to pass. Reactance 3' coacts with resonator 2' as previously described to create a short circuit condition at point A' at the transmitter carrier frequency which on the transmitter side was the frequency to be passed $f_o$ but on the receiver side is the frequency to be rejected $f_r$. Connection point A' is spaced from the point of connection to antenna 7 substantially one quarter wave length of the carrier frequency and the short circuit condition at A' at the transmitter carrier is transformed to a high impedance at the antenna junction which when connected in parallel with the matched load at the antenna junction, has substantially no effect on transmission of transmitter power to the antenna. Thus, on the receiver side, the response curve is the mirror image of that shown in FIG. 1 except that $f_o$ would represent a receiver frequency and $f_r$ the transmitter carrier frequency. The highly desirable characteristics of each filter network thus function to permit $f_o$ and $f_r$ to be positioned much more closely than before.

Figure 4:
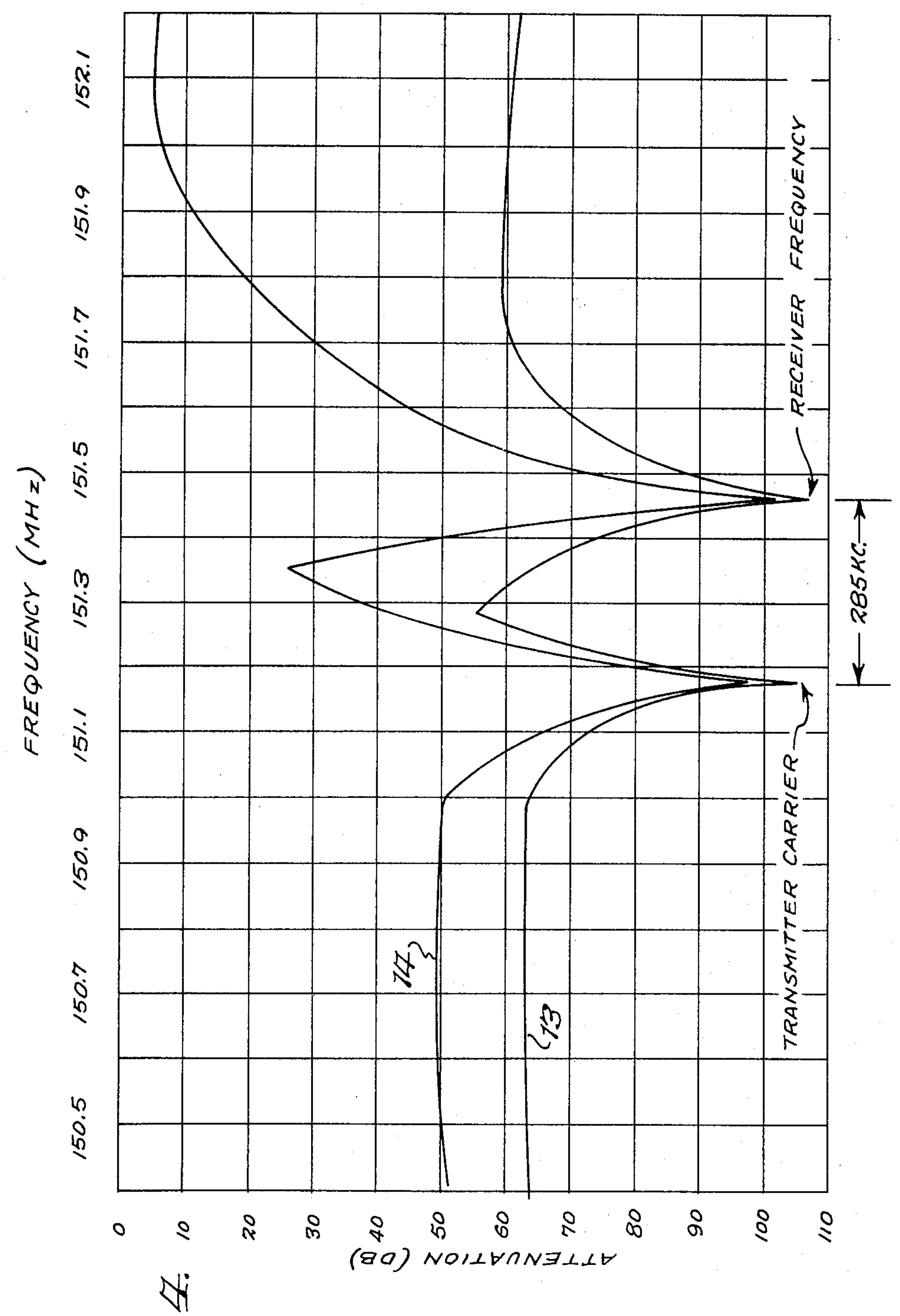
FIG. 4 is a graphical representation comparing the performance of a duplexer using filter networks of this invention with that of a duplexer using conventional notch filters, as viewed between the transmitter and receiver terminals.

The filter network of this invention is particularly effective in a duplexer arrangement because of the relatively greater attenuation provided over the frequency range between the carrier and receiver frequencies. This is clearly evident from a comparison of the attenuation levels at the points of intersection of the mirror image curves in FIG. 1. The additive result of curves such as these is shown in FIG. 4 where curve 13 represents the operating characteristics of a duplexer incorporating a total of six filter networks of this invention (three on each side) and curve 14 represents the operating characteristics of the same duplexer incorporating a total of seven conventional notch filters (four on the transmitter side). In the frequency range between the carrier and receiver frequencies, the minimum attenuation provided by the duplexer having the filters of this invention is over twice that of the other.

Usually, additional filter networks will be provided on either side, spaced apart one quarter wave, for even greater attenuation of transmitter carrier and transmitter noise on and about the receiver frequency.

Connecting lines 4 and 4' together with transmission lines 8 and 10 all are of the same characteristic impedance when an extremely close spacing between transmitter carrier and receiver frequencies is desired. When, on the other hand, a relatively larger frequency separation, such as about 4–5 Mc., is required by a change in operating conditions, connecting lines 4 and 4' each can have a characteristic impedance lower than that of transmission lines 8 and 10. For example, connecting lines 4 and 4' each can comprise a solid air line having a characteristic impedance of about 13 ohms and transmission lines 8 and 10 can comprise standard 50 ohm cable. This optimizes operation of the filter networks for the change in operating conditions while reducing the likelihood of interference in a manner similar to that as described in connection with the single network of FIG. 2.

Figure 5:
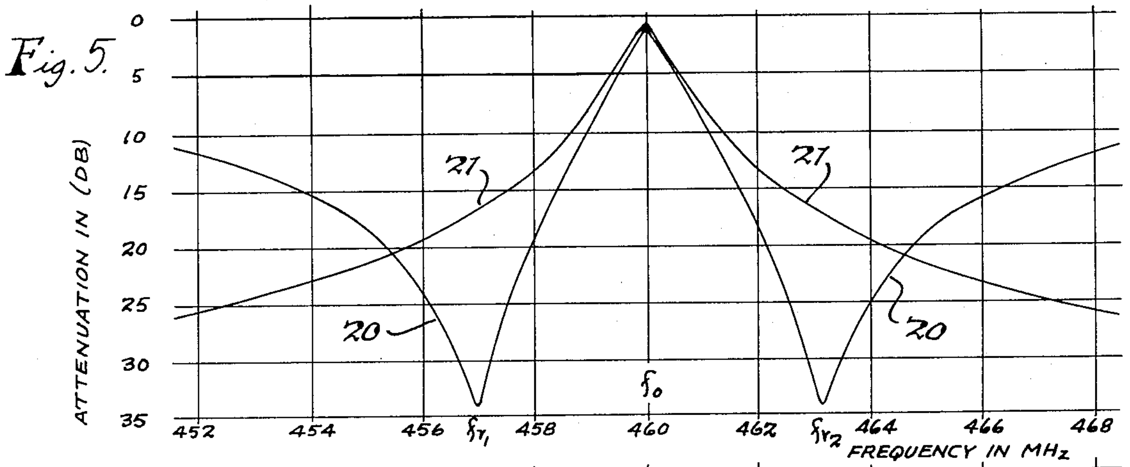
FIGS. 5–7 are graphical representations illustrating the performance of a filter network of the instant invention and compared with that of a conventional bandpass filter, in response to a variation in tuning.
Figure 6:
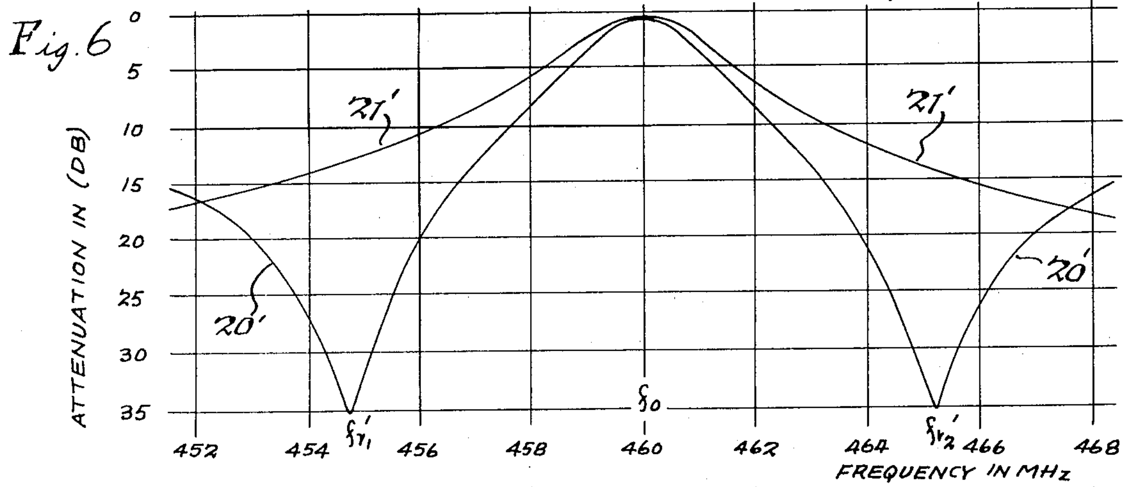
Figure 7:
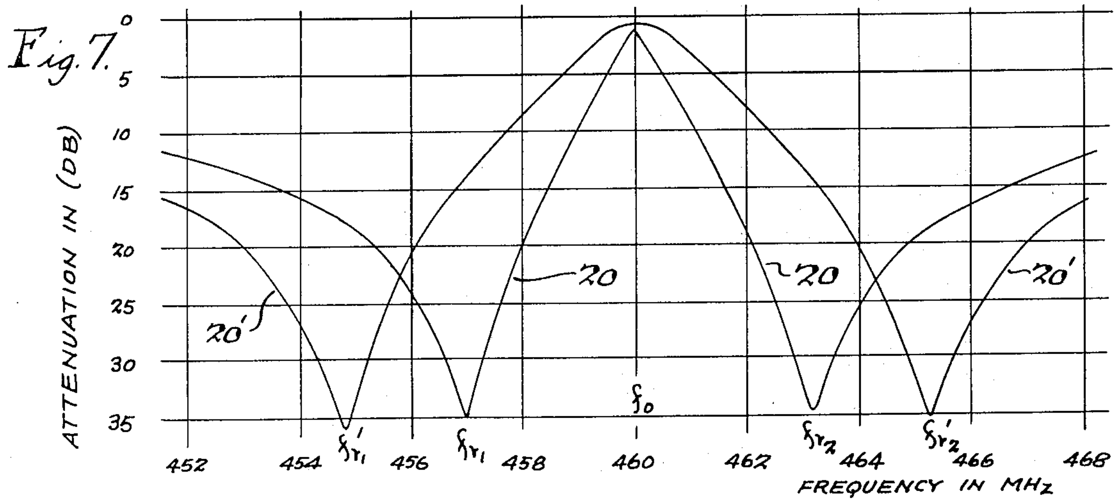

FIGS. 5–7 illustrate the performance of a filter network of the instant invention wherein reactance 3 coacts with resonator 2 to create two short circuit conditions at point A on transmission line 1, which are symmetrically disposed about the filter pass frequency. This is accomplished by a variation in tuning of the basic assembly, on a cavity with an unloaded Q relatively lower, for example about 2,300, than the unloaded Q of the cavity to which the circuit was applied in obtaining the curves of FIGS. 1 and 4, which was about 7,000. The result is a change in the form of the response with the filter being tuned for a pass frequency and two rejected frequencies.

Referring now to FIG. 5, the attenuation curve 20 of the filter of the present invention is contrasted with the attenuation curve 21 of a conventional bandpass filter. Both filters were coupled to their respective cavities for the same loss or attenuation at the frequency to be passed, $f_o$, which in this example is about 460 mhz. The two cavities identically coupled for the same loss also had the same unloaded Q which was about 2300. The filter of the present invention has two relatively sharp rejection notches indicated at $f_{r_1}$ and $f_{r_2}$ in FIG. 5 and occurring at about 457 and 463 mhz, respectively. The fact that this performance from a single filter includes two rejections notches closely spaced to and on each side of the frequency to be passed, $f_o$, is of particular significance for use in multi-coupling where a large number of closely-spaced frequencies are present.

FIG. 6 illustrates the effect of varying the insertion loss by changing the coupling on the performance of the filters from which the curves of FIG. 5 were derived. The new attenuation curve of the filter of the present invention is shown at 20', and the attenuation curve for the bandpass filter is shown at 21'. The filter of the present invention still has two relatively sharp rejection notches, indicated at $f_{r_1}'$, and $f_{r_2}'$, and the effect of increasing the coupling to the cavity is to increase the respective spacing between the rejection notches and $f_0$.

FIG. 7 includes the two attenuation curves 20 and 20' of the filter of the present invention on the same plot to illustrate more clearly the effect of a change in the coupling to the cavity.

Accordingly, it is seen that my invention fully accomplishes its intended objects, providing much greater attenuation of frequencies about the duplexer operating frequencies, permitting a significantly closer spacing between the transmitter carrier frequency and the receiver in a duplex arrangement, and significantly reducing the likelihood of interference from neighboring stations whether used in a duplexer or for single equipment filtering.

Having fully disclosed and completely described my invention, what I claim as new is:

1. In combination: a transmitter having a carrier frequency and a receiver tuned to a frequency closely spaced from said carrier frequency, said transmitter and said receiver having a common antenna, a first transmission line coupling said transmitter to said antenna, a second transmission line coupling said receiver to said antenna, a first filter network connected to said first tranmission line, said network being tuned to pass said transmitter carrier frequency and to reject said receiver frequency, a second filter network connected to said second transmission line, said second network being tuned to pass said receiver frequency and to reject said transmitter frequency each of said filter networks comprising a quarter wave length resonator, a line connecting said resonator to a corresponding one of said first and second transmission lines, said connecting line having a length substantially equal to one quarter wave length of the frequency to be passed, said resonator being tuned to resonate at the frequency to be passed, and reactance means similarly connected by said connecting line to said transmission line and in parallel with said resonator, said reactance means coacting with said resonator to create a condition of antiresonance in susbstantially one quarter wave length relation to said transmission line at the frequency to be rejected.

2. The combination of claim 1, wherein said resonators comprise high-Q cavity resonators.

3. The combination of claim 2, wherein said first and second transmission lines comprise co-axial cables and said reactance means comprise variable length stub sections.

4. The combination of claim 1 wherein said connecting lines have a characteristic impedance which is lower than that of said transmission lines.

5. The combination of of claim 4 wherein each of said connecting lines comprises a solid air line.

* * * * *